United States Patent
Augsburg

(10) Patent No.: US 9,192,998 B2
(45) Date of Patent: Nov. 24, 2015

(54) METHOD FOR CHAMFERING BEVEL GEARS

(75) Inventor: Markus Augsburg, Arnstadt (DE)

(73) Assignee: THE GLEASON WORKS, Rochester, NY (US)

( * ) Notice: Subject to any disclaimer, the term of this patent is extended or adjusted under 35 U.S.C. 154(b) by 428 days.

(21) Appl. No.: 13/608,157

(22) Filed: Sep. 10, 2012

(65) Prior Publication Data

US 2013/0243539 A1 Sep. 19, 2013

Related U.S. Application Data

(60) Provisional application No. 61/534,989, filed on Sep. 15, 2011.

(51) Int. Cl.
*B23F 19/10* (2006.01)

(52) U.S. Cl.
CPC ............... *B23F 19/10* (2013.01); *B23F 19/107* (2013.01); *Y10T 409/101113* (2015.01)

(58) Field of Classification Search
CPC .... B23F 19/102; B23F 19/107; B23F 19/104; B23F 19/105; Y10T 409/101113; Y10T 409/101272
USPC ........................................................ 409/8, 9
See application file for complete search history.

(56) References Cited

U.S. PATENT DOCUMENTS

| | | | |
|---|---|---|---|
| 2,938,436 A * | 5/1960 | Bohle et al. | 409/33 |
| 6,669,415 B2 | 12/2003 | Stadtfeld et al. | |
| 6,712,566 B2 | 3/2004 | Stadtfeld et al. | |
| 7,794,186 B2 | 9/2010 | Peiffer et al. | |
| 2011/0268524 A1* | 11/2011 | Prock et al. | 409/40 |

FOREIGN PATENT DOCUMENTS

| | | |
|---|---|---|
| DE | 10109117 C1 | 7/2002 |
| JP | 08-174335 A | 7/1996 |
| WO | 2011/038201 A1 | 3/2011 |

OTHER PUBLICATIONS

Patent Abstracts of Japan, JP 08-174335 published Jul. 9, 1996, Honda Motor Co. Ltd.
Nanlawala, Michael, "Robotic Automated Deburring of Aerospace Gears", Gear Technology, vol. 18, No. 1, Jan.-Feb. 2001. pp. 19-25.
International Search Report and Written Opinion for PCT/US2012/054370.

* cited by examiner

*Primary Examiner* — Sunil K Singh
*Assistant Examiner* — Alan Snyder
(74) *Attorney, Agent, or Firm* — Robert L. McDowell

(57) ABSTRACT

A chamfering method comprising defining a tooth edge utilizing theoretical data, defining an actual tooth edge utilizing the theoretical tooth edge data, defining a motion path of a chamfering tool and chamfering the actual tooth edge by moving the chamfering tool and the actual tooth edge relative to one another according to the motion path to chamfer the actual tooth edge.

6 Claims, 6 Drawing Sheets

METHOD FOR CHAMFERING BEVEL GEARS

This application claims the benefit of U.S. Provisional Patent Application No. 61/534,989 filed Sep. 15, 2011 the entire disclosure of which is hereby incorporated by reference.

FIELD OF THE INVENTION

The present invention is directed to manufacturing bevel gears and in particular is directed to a method for chamfering bevel gears.

BACKGROUND OF THE INVENTION

In the cutting of gears and other toothed articles, such as bevel gears and in particular spiral bevel and hypoid gears, it is common to produce a burr having a sharp, jagged edge at the end of a tooth where the cutting tool exits the tooth slot. Burrs are particularly noted at the end of concave tooth flanks on spiral bevel ring gears and pinions. Regardless of location on a gear, burrs pose an injury risk to a machine operator as well as a performance hazard during subsequent rolling with a mating member. Therefore, it is essential that burrs be removed.

It may also be desirable to provide a chamfer at one or both ends of gear teeth including tip and root ends. After cutting, sharp corners usually exist at the intersection of the tooth sides, tip and/or root with the front and/or back faces and removing the sharp corners makes handling the gear safer and eliminates a potential area of unacceptably high hardness after heat treating.

There are many methods to deburr or to create a chamfer on toothed metal parts. In deburring, a common technique comprises positioning a blade at the edge of the gear while it rotates. The pre-existing burrs are removed by this blade with a scraping action. Processes like these are usually very fast but offer little chance of creating a specific chamfer on the edge of the tooth. The requirements for positioning a deburring blade are lower than in a true cutting process because of the rather simple blade alignment at the outside of the part.

Generally, chamfering methods can be divided into contactless and contacting categories. Contactless processes include thermal energy machining (TEM) and electro chemical machining (ECM). Contacting processes include chamfering with brushes, files, grinders, cutters (including hobbing tools, end mills and disk cutters with cutting inserts), water jet cutters and hydro erosive grinding (HEG). Currently, the most common methods in the gear cutting industry, however, are chamfering with cutters and deburring with deburring blades as discussed further below.

One example of chamfering utilizing a disk cutter is shown in U.S. Pat. No. 7,794,186 wherein the chamfering device is mounted to the column of a gear cutting machine (e.g. machines as shown in U.S. Pat. No. 6,669,415 or 6,712,566) and uses the X and Y motions of the machine for positioning the disk cutter to the tooth flank. Additionally the chamfering device has a pivot axis which offers an angular adjustment. The setup of the chamfering unit is done by the machine operator in a teach mode. That means that the operator aligns the cutter blade manually to the flank of the part in two or three points and the machine calculates a linear path between them. The manual setup is very delicate and the resulting chamfer can be different for each operator depending on his skills. In the actual chamfering cycle the chamfer unit is lowered some distance, e.g. about 6 inches (152 mm), compared to its home position during the primary gear cutting cycle to prevent interferences. Alternatively, a computer-controlled five-axis chamfering unit may be located on the machine column. The setup of such a unit is also done by the machine operator in a teach mode.

Another chamfering arrangement, such as shown in WO 2011/038201, includes a chamfering unit comprising six independent axes all under computer (e.g. CNC) control wherein the unit is positioned adjacent a separate auxiliary spindle and a cut work piece is transferred from the work spindle of the machine to the auxiliary spindle for chamfering. With so many degrees of freedom, a teaching mode for the chamfering may place an undue burden on the operator.

An object of the present invention is to provide a method of chamfering that is essentially automatic and can be performed without a teaching step.

SUMMARY OF THE INVENTION

The present invention describes a chamfering method comprising defining a tooth edge utilizing theoretical data, defining an actual tooth edge utilizing the theoretical tooth edge data, defining a motion path of a chamfering tool and chamfering the actual tooth edge by moving the chamfering tool and the actual tooth edge relative to one another according to the motion path to chamfer the actual tooth edge.

DETAILED DESCRIPTION OF THE PREFERRED EMBODIMENT

Figure 1:
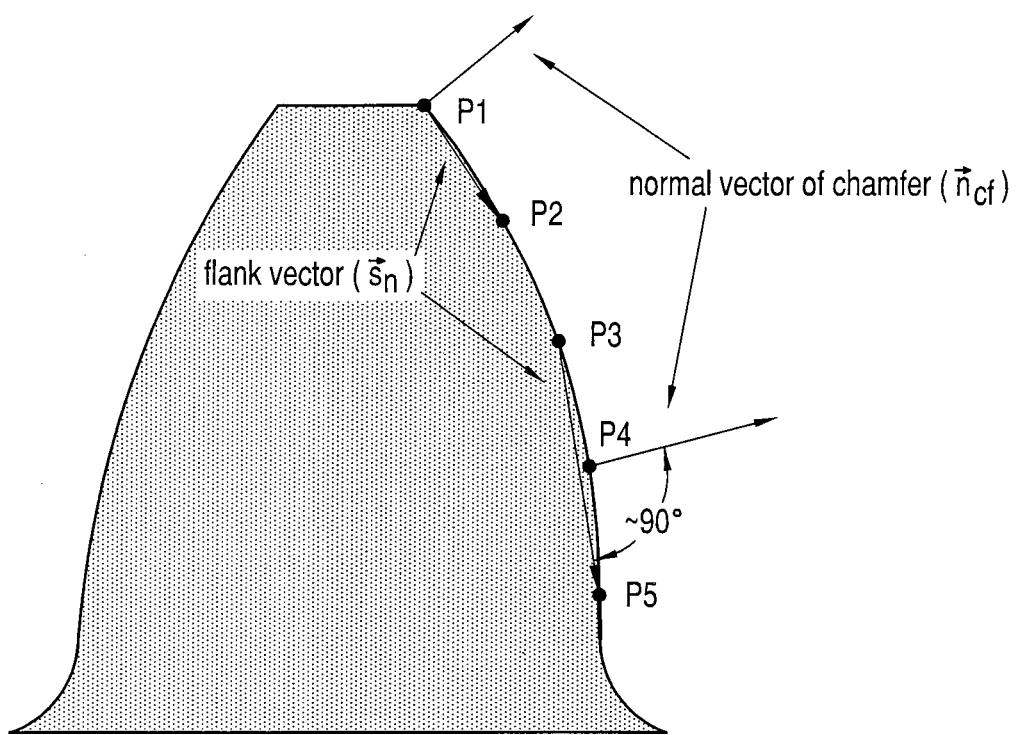
FIG. 1 is a vector illustration for two different points on a tooth profile.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

In order to accomplish the cutting of a chamfer, the geometry of both tooth flank and chamfering cutter is determined. A preferred first step is the determination of a particular desired flank geometry and location of a tooth edge which may be accomplished with existing commercial software tools for design and analysis of bevel gears such as CAGE and/or UNICAL, both of which are known and readily available from The Gleason Works, Rochester, N.Y. The design and analysis tools are used to calculate the X, Y, Z coordinates of the points on the flank surface, including the tooth edge, as well as their normal vectors. If the gear blank geometry varies from theoretical, some available gear design software may not completely capture blank modifications versus the theoretical. Therefore, in order to get matching blank contour and edge points, the gear blank may be measured, on a coordinate measuring machine (CMM), for example, to determine a plurality of points including the crossing point between any primary and secondary back angles.

As for the cutter geometry, chamfer cutters are characterized by the number of blades (starts), the nominal outside diameter, the cutter hand and the flare angle orientation of the insert inside the cutter body. A right hand cutter faces right and a left hand cutter faces left when viewing the outboard face of the body. The explanation of the cutter flare angle is similar to the one of the cutter hand. For example, the tip of a left flared cutter points left when viewing the cutting face of the blade.

The present inventive method for chamfering the edge of a bevel gear tooth is based on nominal data. Nominal data is the three dimensional description of the flank of a bevel gear set available for both the concave and the convex flank of ring gears and pinions. In the inventive method, the points on a specific tooth edge are used to calculate machine motions to produce a defined chamfer. This is possible for all 8 edges (concave and convex flank of heel and toe, pinion and ring gear) as well as the root of a bevel gear tooth as long as the nominal data includes root points.

The preferred chamfering process includes a hobbing motion (i.e. both the work piece and the chamfering cutter rotate in synchronization based on their ratio). The statically calculated initial angle of the chamfer is preferably subsequently corrected with accommodation for the velocity vectors of both workpiece and chamfering cutter.

The center and the orientation of the cutter for different edge points and the path between these points for the several flanks based on the specific settings of the chamfer are determined. Such a determination may further consider information regarding basic information for the part itself (such as number of teeth, spiral angle, pitch angle, root angle and the difference angle) as well as the different types of available chamfer cutters available including different sizes of nominal data grids.

Six degrees of freedom are necessary for a fully automated chamfering setup and the ability to modify key user parameters to specific values. The method is preferably divided into two parts. These are the chamfering of the flank and the chamfering of the root of a tooth.

Basic points of the inventive method for flank chamfering include:

A plurality of tooth flank edge points are defined in three-dimensional coordinates (X, Y, Z) along with the normal vector for each point. This information of the specific edge points is used to determine appropriate positions of the cutter based on user parameters.

Three main vectors which define the chamfer cutter and its cutting direction in space are determined separately for each edge point preferably via vector rotations and transformations. After the particular cutter positions are known, the hobbing motion of the cutter from one edge point to another is determined to chamfer the full edge.

A precise position of the chamfer cutter can be described in the three main vectors. These are the cutter axis vector ($\vec{a}_c$), the radius vector ($\vec{r}_c$) (from the cutter center to a point on the flank) and the velocity vector ($\vec{v}_c$) at the actual cutting point.

An initial position of the cutter for every edge point is determined such as by vector rotations. By taking the previous to and the next point with respect to the actual point (FIG. 1), unless the actual point is the first or the last point on the edge, a smooth motion can be ensured. The angular amount of these rotations is based on user parameters including chamfer angle, cutter engagement angle, clearance angle and cutter type.

The hobbing motion of the chamfer cutter should also be taken into consideration for two reasons. First, to ensure that the cutter does not cut into the flank with a point other than the declared blade point. Second, to determine if the actual chamfer angle is smaller than the desired one because the flank is moving away while it is cutting (retreating motion). Part exiting (retreating) chamfering means the blade will exit the tooth while removing the burrs. This type of cutting direction is preferred because a part entering cutting direction may push the chips inside of the tooth. Part entering chamfering may require an additional clean up after chamfering and may also leave secondary burrs at the inside of the tooth which will negatively affect the performance of the gear set.

Figure 2:
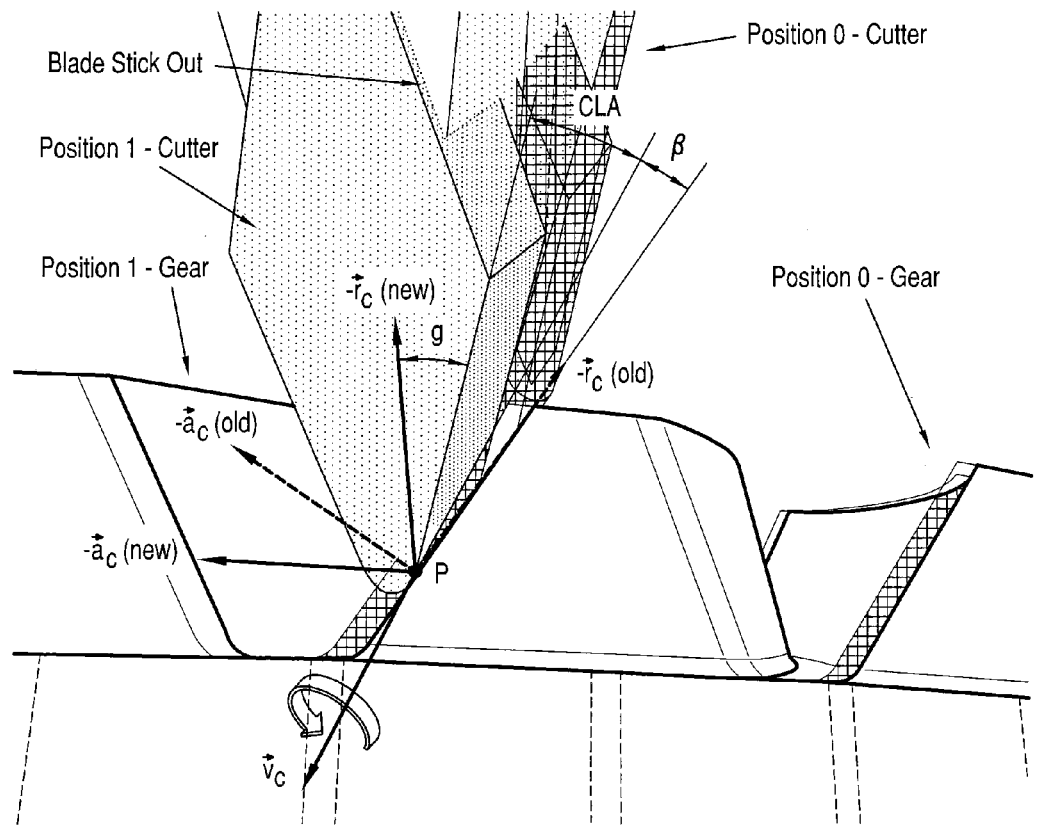
FIG. 2 illustrates the hobbing angle ($\beta$) of the chamfering process.

The first point is solved by rotating the imaginary cutter in its initial position up until the blade point of the cutting insert reaches the same horizontal position as the previous point of the flank as is shown in FIG. 2. The hobbing angle φ prevents the edge of the insert from cutting into the flank of the tooth too early as a result of the hobbing motion.

The resulting angle of the cutter rotation is multiplied with the ratio of cutter to workpiece and results in the necessary angle for the hobbing motion. The determination of this angle is necessary to prevent the edge of the cutting insert from cutting in the flank before the actual cutting point is reached.

The total angle (α) is determined by adding the clearance angle (CLA), the half-rhombus angle (g) of the blade and the angular orientation of the blade (BlTi) to the hobbing angle (β).

$$\alpha = \beta + g + \text{CLA} \pm BlTi \quad (1)$$

This ensures a consistent velocity vector for different flared cutters and different clearance angles. Taking blade point radius and blade point offset into consideration, the initial position for the cutter center can be determined. The actual chamfer angle determined by this method may be smaller than the nominal chamfer angle of the basic settings, due to the retreating chamfering motion of the gear. To adjust the chamfer angle to the desired value, an iterative process is preferably performed.

The angular velocity vectors of cutter and work piece are determined by multiplying the axes of both parts respectively, with 2π times the rpm. The particular velocity vectors are determined with the cross product of the angular velocity and their respective radius vectors.

$$\vec{v} = \vec{\omega} \times \vec{r} \quad (2)$$

Figure 3:
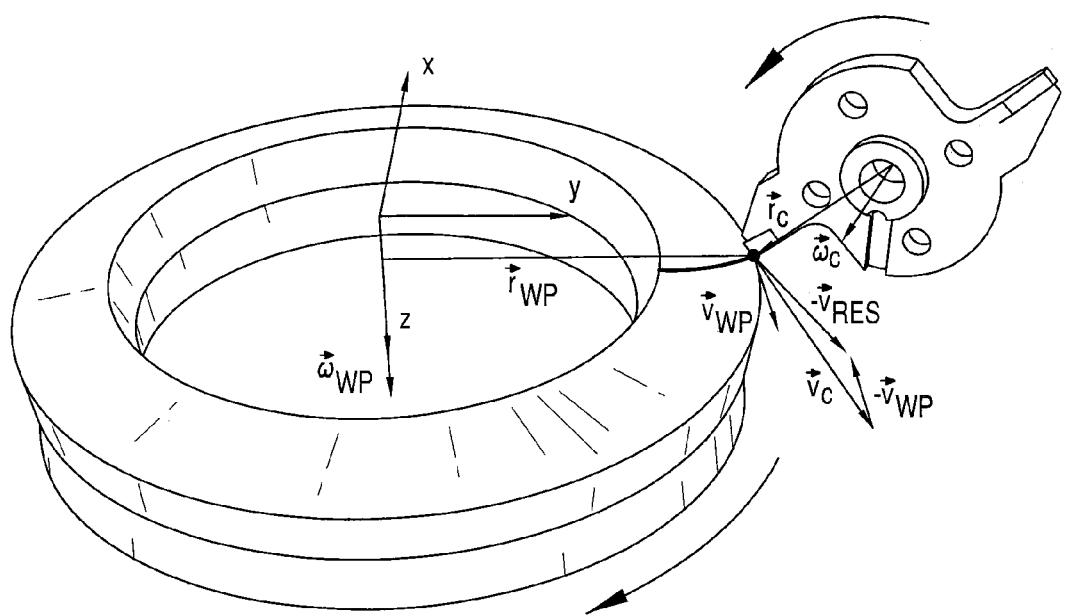
FIG. 3 shows velocity vectors of chamfer cutter and work piece.

The resulting velocity vector is determined by adding the velocity vectors with respect to their correct sign as shown in FIG. 3.

$$\vec{v}_{Res} = \vec{v}_C - \vec{v}_{WP} \quad (3)$$

Figure 4:
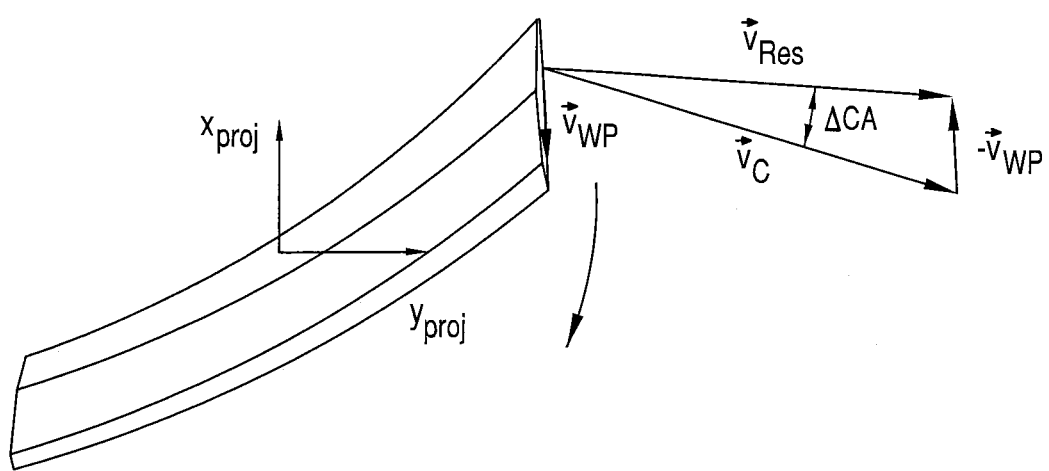
FIG. 4 illustrates the actual chamfer angle (ACA).

The Actual Chamfer Angle (ACA) is determined by subtracting the chamfer angle, ΔCA (which is calculated over the particular velocity vectors) from the nominal chamfer angle (NCA). The velocity vectors of both parts are projected in a plane tangential to the pitch cone of the work piece as demonstrated. In the graphic of FIG. 4 the paper surface represents the tangential plane.

The actual chamfer angle, ACA, is determined with the following equation.

$$ACA = NCA - \Delta CA = NCA - \left(\arctan\left(\frac{v_{C\_x}}{v_{C\_y}}\right) - \arctan\left(\frac{v_{Res\_x}}{v_{Res\_y}}\right)\right) \quad (4)$$

Once the actual chamfer angle of the initial position is known, an iterative process is done which increases the nominal chamfer angle until the actual chamfer angle equals the original desired nominal chamfer angle. At this point, the velocity vector of the cutter is the one of the initial position.

Figure 5:
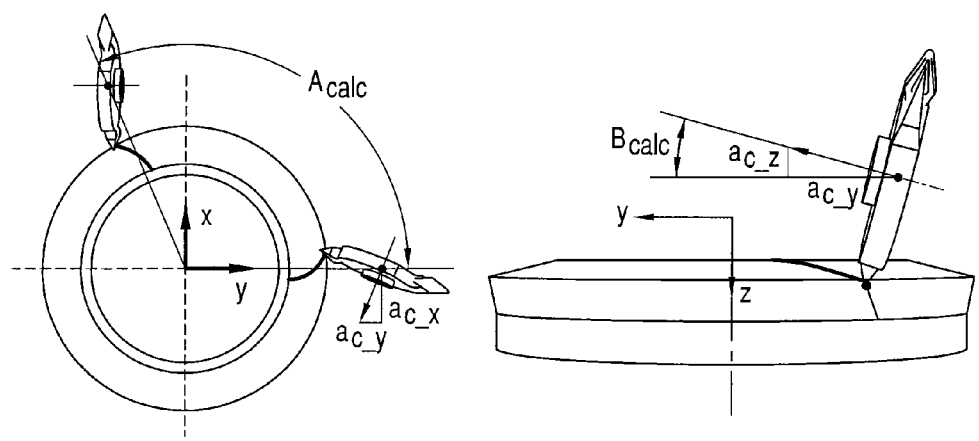
FIG. 5 illustrates machine axis positions $A_{Calc}$ and $B_{Calc}$.

The remaining machine axis positions such as $A_{Calc}$ and $B_{Calc}$ (see FIG. 5) are determined with the axis orientation of the chamfer cutter. The $A_{Calc}$ angle is the angle of the work piece and the $B_{Calc}$ angle is the angle between the axes of the work piece and the cutter in the upright position.

The angle $A_{Calc}$ is defined as the angle between the cutter in the original orientation of the tooth and the cutter in the upright position. In the upright position, the X-coordinate of the cutter axis equals zero and the axis vector points in the positive Y-direction as displayed in FIG. 5—left.

After the calculation of $A_{Calc}$, the cutter axis and the radius vector are rotated around Z into the upright position, the angle $B_{Calc}$ can be calculated according to the following equation.

$$A_{Calc} = \left(90 - \arctan\left(\frac{a_c}{-a_{c\_y}}\right)\right) \quad (5)$$

$$B_{Calc} = \arctan\left(\frac{a_{C\_z}}{-a_{C\_y}}\right)^x \quad (6)$$

Since the chamfering of bevel gears by the velocity vector method is a six degree-of-freedom task, a remaining angle is the E-angle. The E-angle is the angle of the cutter itself. In the calculation scheme, E equals zero degree when the tip of the blade has the same Z-coordinate as the center of the cutter. This corresponds to a zero Z-component of the radius vector. This vector is determined with the help of the components of the radius vector in the upright position.

Basic points of the inventive method for root chamfering include:

For the chamfering process of the root of a bevel gear, a different method is necessary because the flank method applied to the bottom of the tooth would cause a high B-angle and interference issues with the opposite flank. Furthermore the active cutting area of the blade needs to migrate from the blade point to the tip otherwise the tip would cut too deep into the metal. To obtain a specified root chamfer, edge points in the root of the tooth are identified. One manner of identifying root edge points is with the known commercially available product "Root CMM" from The Gleason Works which is able to calculate points in the root based on the basic settings of the cutting cycle. These points and their normal vectors are also saved in a nominal data file.

For root chamfer calculations the vectors for cutter axis, radius and velocity are taken from the last point of the flank (closest to the root). The clearance angle for the root may be increased up to about 10 degrees to avoid cutting into the flank in case of undercut. The cutter engagement angle is also recalculated to fit the desired chamfer angle in the root. To accomplish this, the angle E of the last flank point and the root angle, GAFR, of the work piece are taken into consideration. The radius is rotated around the cutter axis by the amount of $\delta_{Root}$ to achieve the desired chamfer angle in the root.

$$\delta_{Root} = GAFR - E(fp) - NCA \quad (7)$$

Figure 6:
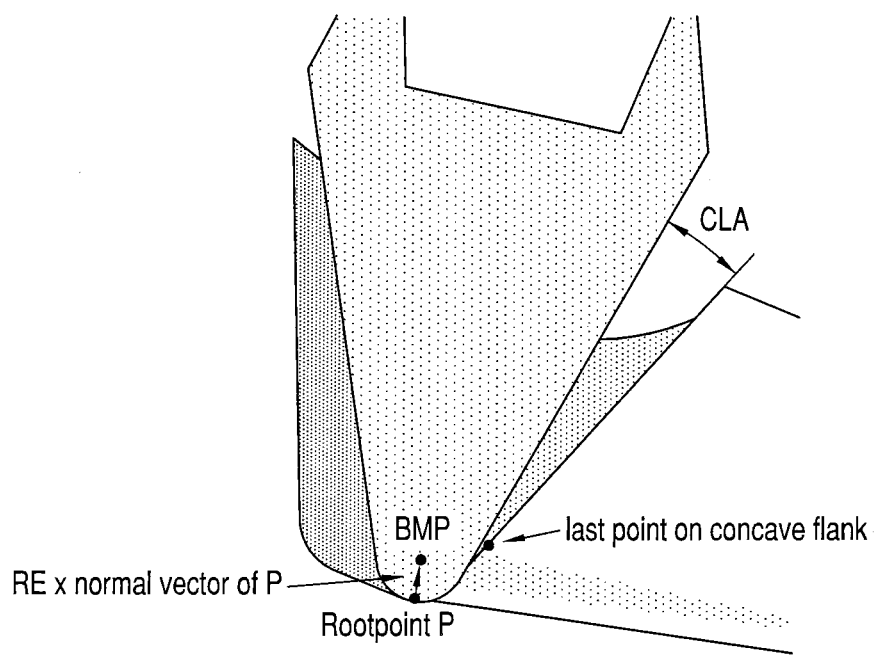
FIG. 6 illustrates the determination of the root point, P, for root chamfering.

Once determined, the actual unit radius vector, cutter axis vector and velocity vector stay the same for all the root points. One of the differences between flank chamfering and root chamfering is the active cutting point on the blade. The actual cutting point on the blade now is in motion along the radiused tip of the insert instead of remaining fixed at the blade point as it is for flank chamfering. The depth of the chamfer is also determined differently for flank chamfering and root chamfering. Whereas in flank chamfering a work piece set-over (A-angle) is employed to achieve a certain chamfer depth, in root chamfering the chamfer depth is determined in a direction normal to the actual point. The center of the cutter is determined using the normal vector at each point, the tip radius, RE, of the insert, the specified depth of the chamfer, CD, and the center point of the blade tip, BMP, as shown in FIG. 6.

In machining operations, gear root sections may be cut deeper than their theoretical depth due to slight deviations in the blade geometry of the gear cutting equipment. To accommodate this, the chamfer depth of flank and root are preferably separated from each other to make independent adjustment of the root chamfer possible without affecting the chamfer depth of the flank. Even with the above-mentioned "Root CMM" and similar products, the resulting nominal data files may not reflect the complete root of the tooth. Therefore, to ensure the whole root is chamfered, an additional point in the middle of the root may be determined using the difference angle, preferably saved in the nominal data file, and the last root point of the opposite flank.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of chamfering at least one edge of a tooth on a bevel gear having a plurality of teeth with a rotatable chamfering cutter having a plurality of cutting blades, said method comprising:

selecting at least one tooth edge for chamfering, defining said at least one tooth edge by a plurality of edge points located along said at least one tooth edge, determining an orientation of said chamfering cutter at each of said edge points, determining a path of chamfer cutter travel between each of said edge points, rotating said chamfer cutter and moving said chamfer cutter relative to said at least one tooth edge along said path of chamfer cutter travel to produce a desired chamfer on said at least one tooth edge, said chamfer cutter transitioning from a determined orientation at one point to a determined orientation at a successive point for all edge points along said path of chamfer cutter travel on said tooth edge, wherein the cutting blades of said chamfer cutter include a cutting edge and a radiused cutting tip, said chamfering of said at least one edge of a tooth being conducted by said cutting edge and wherein a cutting point of said chamfer cutter remains in a fixed position on said cutting edge, said method further including chamfering an edge of a root portion between successive teeth on said bevel gear, said chamfering of the root portion being conducted by the radiused cutting tip wherein the cutting point on said cutting edge is in motion along said radiused cutting tip during said chamfering of the root portion, wherein said method of chamfering is carried out without a teaching step.

2. The method of claim 1 wherein during said chamfering, said chamfer cutter and said bevel gear are rotated according to a hobbing motion defined by the ratio of the number of cutting blades on said chamfer cutter and the number of teeth on said bevel gear.

3. The method of claim 1 wherein said edge of a root portion is defined by a plurality of edge points located an edge of said root portion.

4. The method of claim 1 wherein said bevel gear comprises one or both of a ring gear and a pinion.

5. The method of claim 1 wherein said chamfer cutter is rotatable about an axis of rotation, said bevel gear is rotatable about an axis of rotation, and said chamfer cutter and said bevel gear are movable with respect to one another linearly in three mutually perpendicular directions and angularly about a pivot axis.

6. The method of claim 1 wherein said chamfer cutter is rotated in a direction whereby said cutting blades exits a tooth while chamfering.

* * * * *